April 20, 1943.　　　C. K. WOODMAN　　　2,316,911
WORK-LOCATING MECHANISM
Filed April 10, 1942　　　3 Sheets-Sheet 2
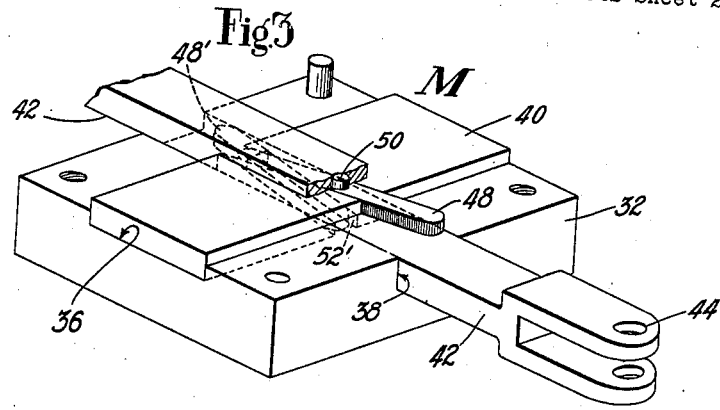
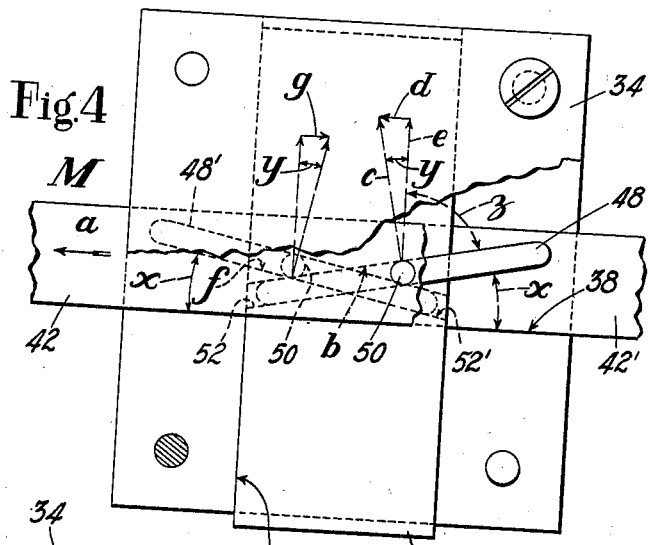
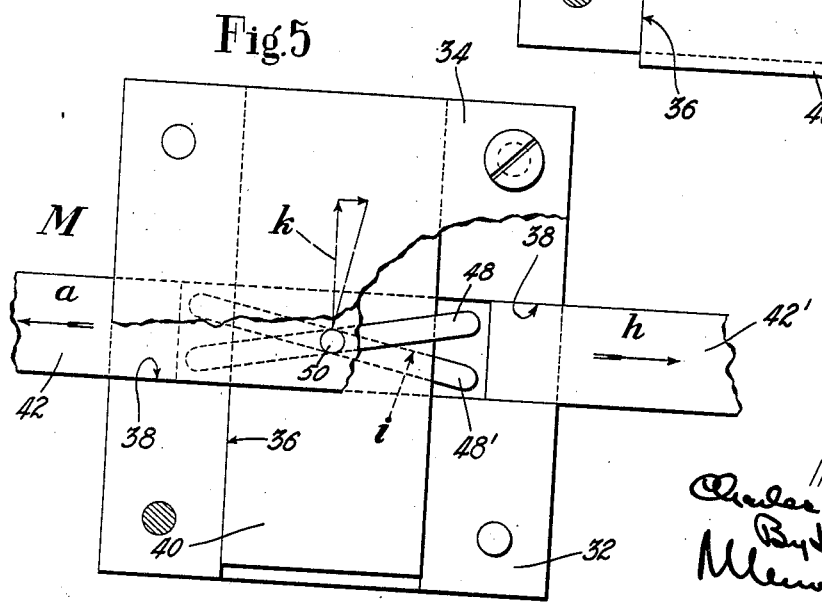

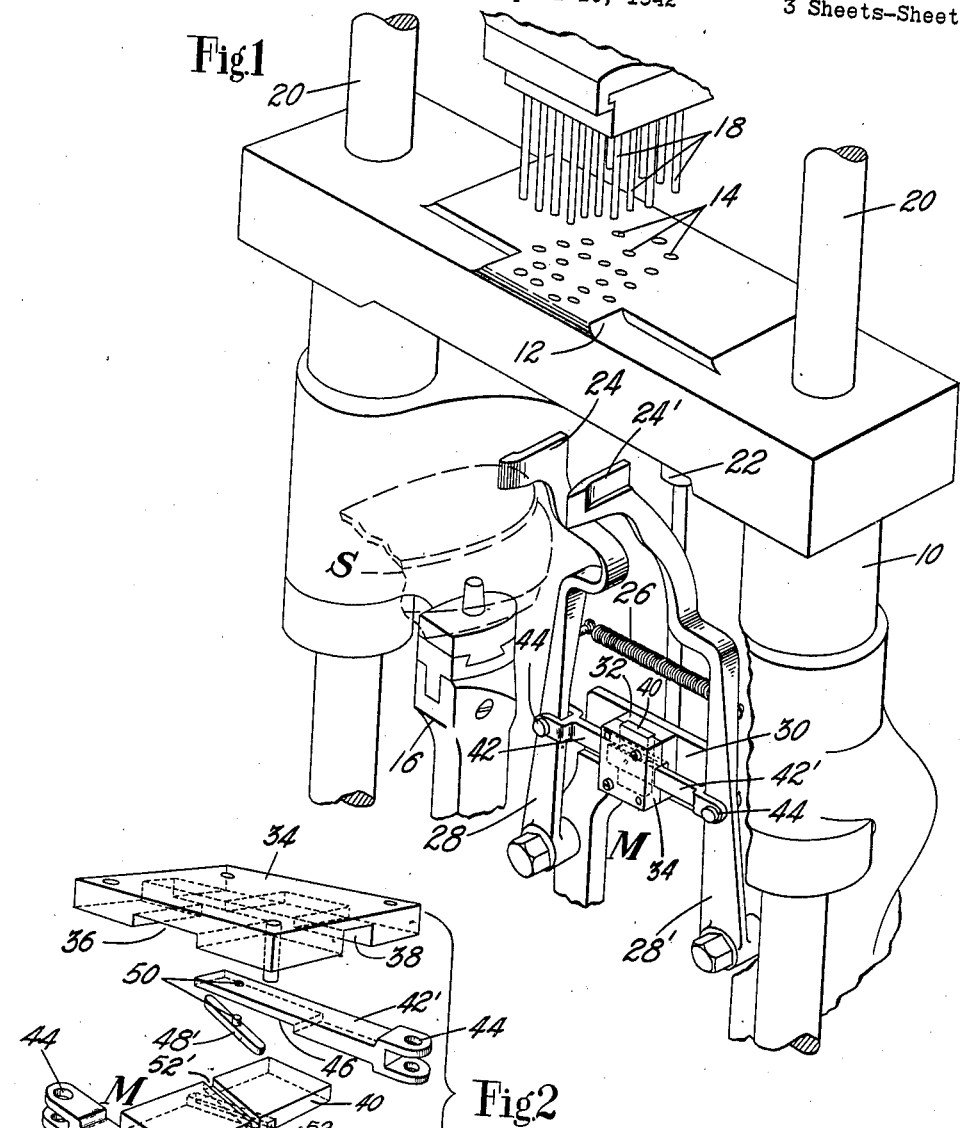
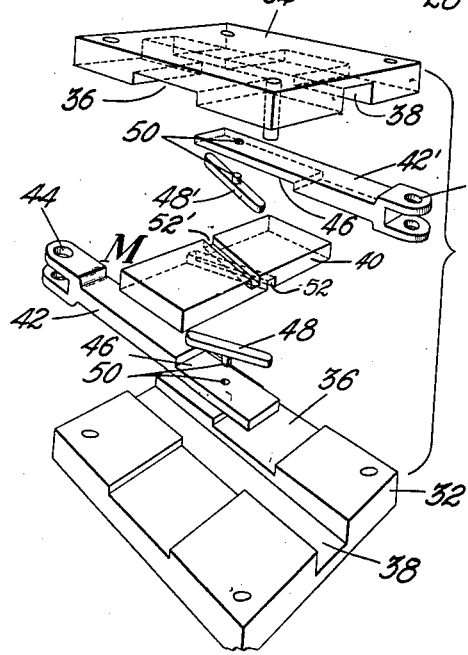

Patented Apr. 20, 1943

2,316,911

UNITED STATES PATENT OFFICE 2,316,911

WORK-LOCATING MECHANISM

Charles K. Woodman, Beverly, Mass., assignor to United Shoe Machinery Corporation, Flemington, N. J., a corporation of New Jersey Application April 10, 1942, Serial No. 438,482

15 Claims. (Cl. 1—32)

My invention relates to mechanism for locating work for operations upon it, a possible utilization being in connection with the positioning or centering of a shoe laterally for the attachment of its heel. It is to be understood, however, that the invention may be employed for other kinds of work and for its location in different directions by a varying number of work-engaging members.

When work-pieces, with the aid of opposed gage members, are put in operating relation to mechanism which is to act upon them, there may be such attendant conditions, as the inability of the operator to see the work when thus being located and to feel when it is in place, or the speed with which the act is performed, that the operation may be caused before the correct location has been attained, contact having been established with only a portion of the gage members. This being the case, a defective operation may result. Such a difficulty is encountered, for example, in the use of the well known gage mechanism in which opposite work-contacting arms are so geared together that each compels equal and opposite movement of the other. It is an object of my invention to ensure that the work is in its proper location, as determined by both the gage members of a pair or all the members of a plurality of pairs.

To gain the above end, I provide a plurality of members or arms, movable by engagement with the work, together with means by which the members are connected to move together, and which are effective only when force is applied by the work to a plurality of the members, the connecting means otherwise furnishing a lock for one of the work-engaging members against movement by another. With such an organization, the operator, for a pair of members, must bring the work into contact with both before they can be separated, said work being unfailingly centered transversely. There is preferably included in the connecting means a pair of contacting inclined surfaces for each of the work-engaging members. The angle of inclination is such as to prevent the transmission of movement from one member to another, it not exceeding the limiting angle of resistance to movement of the connecting means in one direction. These inclined surfaces may be upon a member movable by each of opposite work-engaging arms and upon an intermediate or coupling member. The members may assume various forms, as slides joined to the arms and operating in grooves in an intermediate slide; or for the slides gears may be substituted. In the former arrangement the arm-slides are herein shown as having keys, pivoted upon them and movable in oppositely inclined grooves in the intermediate slide. In the latter, worms are rotatable by the work-engaging arms and are coupled by a worm-wheel, the intermeshing teeth furnishing the inclined surfaces.

In the accompanying drawings,

Fig. 1 shows, in perspective, one form of my invention applied to a heel-attaching machine;

Fig. 2 is a separated perspective view of the connecting mechanism of Fig. 1;

Figure 6:
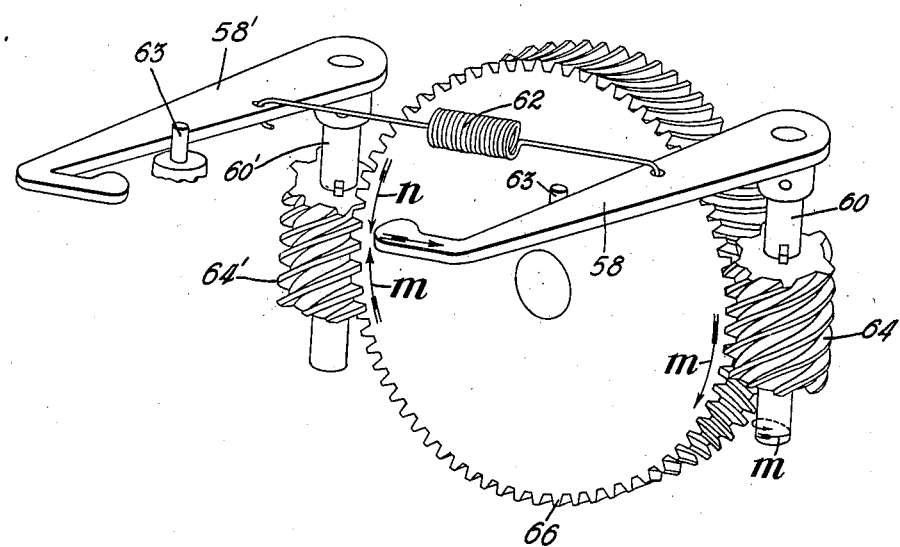

Fig. 3, a broken perspective of this mechanism assembled;

Fig. 4, a broken front elevation with its elements in their inactive relation;

Fig. 5, a similar view after action;

Fig. 6, a perspective view of a second form of the invention; and

Figure 7:
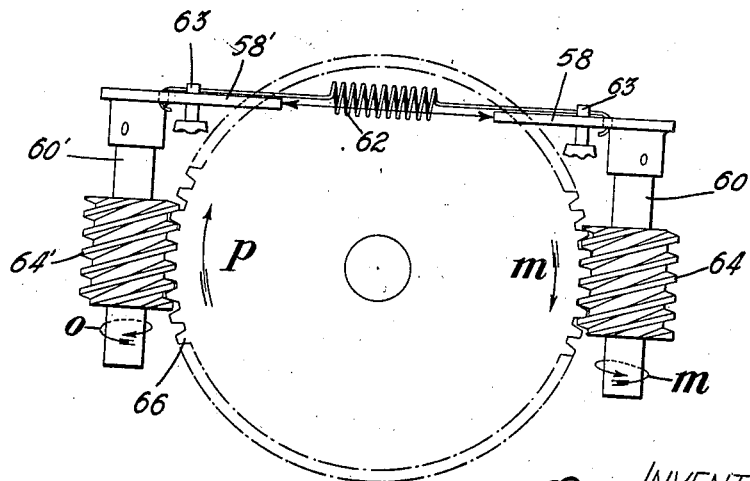

Fig. 7, a front elevation thereof.

Referring to Fig. 1, at 10 appears the frame of a heel-attaching machine of the well known Lightning type, upon which is supported a die 12 having passages 14 from which nails may be driven through a heel supported beneath the die and into the heel-seat of a shoe S carried by a jack 16. This is accomplished, after the jack has been lifted to force the heel and shoe toward the die, by drivers 18 movable in the passages 14 updie, on reciprocatory side-rods 20, 20. The shoe, movable both with and upon the jack, is located for the operation upon it by a back-stop 22 and opposed counter-clamps or gage members 24 and 24', which are drawn toward each other by a tension-spring 26 and separated by the jacked shoe as it is moved rearwardly between them. This is generally as disclosed in Letters Patent of the United States No. 1,177,784, Lund, April 4, 1916.

It is in connection with such work as is indicated above, or that of an analogous nature, that the present invention is concerned. The gage members 24 and 24' are shown as carried, respectively, upon upwardly extending arms 28, 28' pivoted upon the frame. These arms are compelled to move together by being joined through novel mechanism M, which is illustrated in detail in Figs. 2, 3, 4 and 5 of the drawings. Supported at 30 with the back-stop is a casing, shown as having a rear section 32 and a front section 34, separably secured to each other. In the casing-sections are registering vertical grooves 36, 36 and horizontal grooves 38, 38, the latter being deeper. In the grooves 36, a connecting slide 40 fits and is movable, while the grooves 38 similarly contain connecting slides 42 and 42', respectively pivoted at 44 to the arms 28 and 28'.

The slides 42 and 42' are each recessed or offset at 46 at their extremities to receive a connecting key 48 or 48', pivoted to it at 50, each key furnishing a projection from the arm-slide and being movable along a groove 52 or 52' in the opposite faces of the coupling-slide 40. The grooves 52, 52' are inclined to the direction of movement of the connecting slides, this being horizontal, they preferably lying at equal angles thereto. The magnitude of the angle $x$ thus formed (Fig. 4) is such that force applied to a key through a wall of the groove and at right angles thereto will not produce movement of the corresponding connecting slide 42 or 42'. That is, this angle $x$ does not exceed the limiting angle of resistance, which is usually taken between the applied force and the perpendicular, as is represented in Fig. 4 by a like angle $y$.

Assume that the operator of the heel-attaching machine, illustrated in Fig. 1 of the drawings, has jacked a shoe S and wishes to center it beneath the die 12 for the attachment of its heel. As he stands in front of the machine, the counter-clamps 24, 24' are hidden from him, so as he moves in the jack the shoe may engage one only of the clamps, for example, that designated as 24. In that case, as is indicated by the arrow $a$ in Fig 4, a force is applied to the slide 42 and not to the slide 42'. The key 48 will transmit to the wall $b$ of its groove 52 in the slide 40 a force perpendicular to the said wall, as shown by the line $c$. This force may be resolved into two components, one horizontal, indicated at $d$, acting to urge the slide 40 toward the left-hand wall of its groove 36, and a larger component $e$ tending to lift the slide 40 in the casing. The angle $z$ between this force $e$ and the wall $b$ is the complement of the angle $y$. As just noted, no outward force is exerted upon the slide 42'. If the counter-clamps are to be separated to admit the shoe, the wall $f$ of the groove 52' must act upon the key 48' with a force, in the direction indicated by the line $g$, to shift the slide 42'. But on account of the character of the angle $y$, the slide 42' is locked against movement in this direction by the force thus applied. At once feeling the positive character of the resistance encountered, the operator continues the rearward movement of the jack and shoe, the usual outwardly diverging end of the clamp 24 deflecting said shoe upon the jack toward the opposite clamp 24'. As soon as substantial force is exerted upon this clamp 24', movement will be transmitted to its slide 42' in the direction of the arrow $h$ in Fig. 5, and its key 48' will place upon the wall $i$ of the groove 52' a force having a vertical component $k$. This has the same effect upon the coupling-slide 40 as the force shown by the arrow $e$ in Fig. 4, and coming from the first-engaged clamp 24. The lock is thus removed from the coupling-slide, and the clamps are simultaneously separated to admit and center the shoe, as it is carried into the operating position against the back-stop 22. It will be seen that, since the engaged members 24 and 24' cannot separate unless force has been applied to both, the operator cannot be misled by the yield of one into the belief that the work has been centered or gaged transversely. He, therefore, will not be caused to start prematurely the operation of the machine, and secure the heel and shoe against the die 12 out of correct position by the elevation of the jack 16, in preparation for the action of the nailing mechanism. This is assured, regardless of whether the work can be seen, and is independent of the character of the resistance to its movement. If the jacked shoe is pressed in between the counter-clamps until its movement is checked by the back-stop, the assumption of the proper operating position is certain. Then, too, since the strength of the spring 26 is only that necessary to urge the engaging members normally toward each other and not to impart movement to the work, it may be of such a character that there is no danger of marring the material with which they contact.

In Figs. 6 and 7, appears a modification of the invention illustrated in Figs. 1 to 5. The principle of its action and the general results are the same, so only a brief description of the structure will be necessary. Opposed work-engaging arms 58, 58' are secured for horizontal oscillation upon the upper extremities of vertical parallel shafts 60, 60', respectively. The arms are drawn toward each other by a connecting tension-spring 62 to an extent permitted by stops 63, 63, with which the arms contact. Upon the shafts 60, 60' are worms 64, 64', respectively, the spiral teeth of which advance about the shafts in the same direction. The teeth of both worms mesh with the teeth of an intermediate worm-wheel 66, which connects them to turn together. As in the previous instance, the engaged surfaces of the teeth of the worms and the worm-wheel are at an angle not exceeding the limiting angle of resistance. If a force is applied to the arm 58, and through this to the shaft 60 and worm 64, it will tend to rotate the worm-wheel 66, this being in the direction indicated by the arrows $m$ in Fig. 6. But, assuming the arm 58' to be unactuated, the worm-wheel, under the influence of the arm 58, acts upon the worm 64' with a force which is applied through surfaces lying at not more than the locking angle and indicated by the arrow $n$, which will oppose rotation. When, however, the worm 64' is rotated in the direction of the arrow $o$ in Fig. 7, upon engagement of the work with the arm 58', this being oppositely to the direction of rotation of the worm 64, the force exerted by the two worms will be added to turn the worm-wheel in the direction of the arrow $p$.

Having described my invention, what I claim as new and desire to secure by Letters Patent of the United States is:

1. Locating mechanism having a plurality of members movable by engagement with the work, and means for connecting the members to move together, said connecting means being effective only when force is applied from the work through a plurality of the engaging members.

2. Locating mechanism having opposite members movable by engagement with the work, and means for connecting the members to move together, there being inclined contacting surfaces including a surface individual to each member and through which such member acts, the angle of inclination being such as to prevent the transmission of movement from one member to another.

3. Locating mechanism having a plurality of members movable by engagement with the work, and means for connecting the members to move together, there being included in the connecting means inclined contacting surfaces including a surface individual to each member and through which the movement of the work-engaging members is transmitted, the inclination of these surfaces not exceeding the limiting angle of resistance to movement of the connecting means in one direction.

4. Locating mechanism having opposed members movable by engagement with the work, a movable coupling member, and connecting means movable by each work-engaging member, each connecting means and the coupling member having opposite contacting surfaces inclined with respect to movement of the coupling member, the angle of such inclination for each pair of contacting surfaces not exceeding the limiting angle of resistance.

5. Locating mechanism having a pair of arms movable oppositely by engagement with the work, a member movable by each arm and provided with an inclined surface, and an intermediate member having inclined surfaces complemental to both the surfaces of the arm-actuated members and movable thereby in the separation of the arms.

6. Locating mechanism having a pair of arms movable oppositely by engagement with the work, means for urging the arms toward each other, a member movable by each arm and provided with an inclined surface, and an intermediate member having inclined surfaces complemental to both the surfaces of the arm-actuated members and movable thereby in the separation of the arms.

7. In a heel-attaching machine, fastening-inserting mechanism, a jack movable into and out of operating position, opposite clamps for engagement with a jacked shoe, and connecting means between the clamps movable only upon engagement of the opposite sides of the shoe with said clamps.

8. In a heel-attaching machine, fastening-inserting mechanism, a jack movable into and out of operating position, opposite arms provided with counter-clamps, a member movable by each arm and having an inclined surface, and an intermediate member having inclined surfaces complemental to both the surfaces of the arm-actuated members and movable thereby, the inclination of each pair of surfaces not exceeding the limiting angle of resistance.

9. Locating mechanism having a pair of arms movable by engagement with the work, a slide connected to each arm, and an intermediate slide provided with oppositely inclined grooves, the arm-slides having portions movable in the grooves.

10. Locating mechanism having a pair of arms movable by engagement with the work, a slide connected to each arm, an intermediate slide provided with oppositely inclined grooves, and projections from the arm-slides movable in the grooves, the inclination of each groove not exceeding the limiting angle of resistance to the movement by the intermediate slide of the arm-slides.

11. Locating mechanism having a pair of arms movable by engagement with the work, a slide connected to each arm, an intermediate slide provided with oppositely inclined grooves, and a key pivoted upon each arm-slide and movable in one of the grooves.

12. Locating mechanism having a pair of arms movable by engagement with the work, a worm rotatable by each arm, and a worm-wheel meshing with both worms.

13. Locating mechanism having a pair of arms movable by engagement with the work, a worm rotatable by each arm, and a worm-wheel meshing with both worms, the spiral teeth of both worms advancing in the same direction.

14. Locating mechanism having a pair of arms movable by engagement with the work, a worm rotatable by each arm, and a worm-wheel meshing with both worms, the angle of the contacting surfaces of the teeth not exceeding the limiting angle of resistance.

15. Locating mechanism having a pair of arms movable by engagement with the work, a worm rotatable by each arm, and a worm-wheel meshing with both worms, the angle of the contacting surfaces of the teeth of both worms with the worm-wheel not exceeding the limiting angle of resistance to movement by the worm-wheel of the worms.

CHARLES K. WOODMAN.